O. M. HIRES.
GLUE KETTLE.
APPLICATION FILED MAY 5, 1916.
1,189,816.
Patented July 4, 1916.
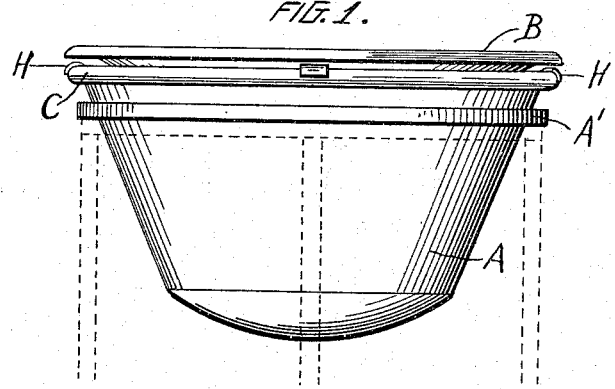
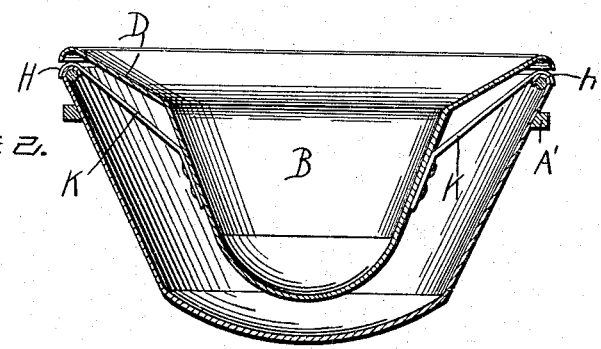
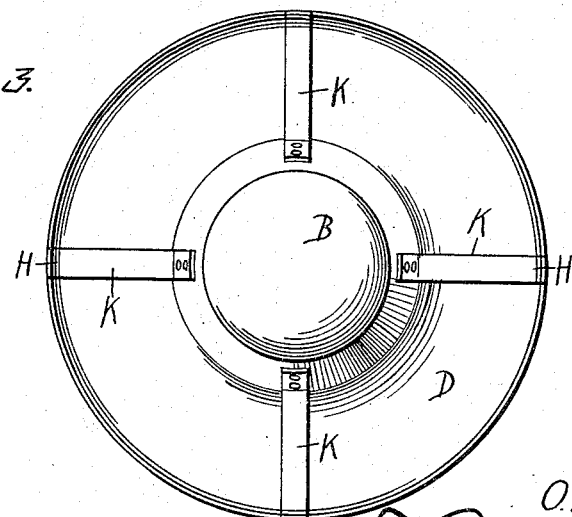
Witness
Wm. F. Doyle.
L. R. Fiedler
Inventor
O. M. Hires
By Frank N. Hough
Attorney

UNITED STATES PATENT OFFICE.

OWEN MADISON HIRES, OF WAYCROSS, GEORGIA.

GLUE-KETTLE.

1,189,816. Specification of Letters Patent. Patented July 4, 1916.

Application filed May 5, 1916. Serial No. 95,700.

*To all whom it may concern:*

Be it known that I, OWEN M. HIRES, a citizen of the United States, residing at Waycross, in the county of Ware and State of Georgia, have invented certain new and useful Improvements in Glue-Kettles; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in non-scorchable glue kettles and comprises a simple and efficient device of this character having various details of construction, combinations and arrangements of parts which will be hereinafter fully described, shown in the accompanying drawings and then specifically defined in the appended claims.

My invention is illustrated in the accompanying drawings, in which:—

Figure 1 is a side elevation of my improved glue kettle. Fig. 2 is a vertical sectional view through the same. Fig. 3 is a bottom plan view of the inner receptacle removed.

Reference now being had to the details of the drawings by letter, A designates a kettle which is preferably of the shape shown in Fig. 1 of the drawings, and adapted to be heated to heat the glue contained within the inner receptacle B. Said kettle A has a rim A' about is circumference adjacent to its top and which is adapted to contact with any suitable supporting means, not shown. The upper end of the receptacle A has a rounded beading C and the inner receptacle has an inclined flange D about its top, the outer marginal edge of the flange being curved, as shown in the sectional view of the drawings. The inner receptacle is tapering and is of considerably smaller size than the outer kettle in order to have an intervening space for the water to heat the glue. Resilient arms, designated by letter K, are fastened to the outer circumference of the inner receptacle, at any suitable location such as opposite each other, and their upper ends are bent to form hooks H which engage over the beading at the upper end of the inner receptacle, leaving a space intervening between the flange of the inner receptacle and said beading whereby steam generated from the water within the inner receptacle for heating the glue pot may escape. It will be noted that the flange of the inner receptacle flares outwardly sufficiently to cover the entire top of the outer receptacle and any glue which may drip from an object inserted in the glue pot may run back into the latter.

By the provision of a glue pot made in accordance with my invention, it will be noted that a simple and efficient means is afforded whereby glue may be readily heated and prevented from being scorched, the inner receptacle being held from contact with the outer one which latter is adapted to contain water, suitable means being provided for allowing the steam to escape between the receptacles.

What I claim to be new is:—

1. A non-scorchable glue kettle comprising an outer water containing receptacle and an inner glue pot, arms fastened to the glue pot and having their ends bent to form hooks adapted to engage over the outer ends of the receptacle, spacing the two receptacles apart by which the vapors may escape, the glue receptacle having an inclined flange about its upper end and projecting over the top of the outer receptacle.

2. A non-scorchable glue kettle comprising an outer water containing receptacle and an inner glue pot, resilient arms fastened to the circumference of the inner receptacle and their free ends terminating in hooks adapted to engage over the inner edge of the outer receptacle, the upper edge of the inner receptacle having an inclined flange, the marginal edge of which is curved and extending over the upper edge of the outer receptacle and spaced apart therefrom by which the vapors may escape.

In testimony whereof I hereunto affix my signature in presence of two witnesses.

OWEN MADISON HIRES.

Witnesses:
A. B. SPRUCE,
J. HILL SPRUCE.